United States Patent [19]

Okumura et al.

[11] Patent Number: 5,055,122
[45] Date of Patent: Oct. 8, 1991

[54] METHOD OF CONTROLLING FEED OF MOLTEN GLASS ONTO MOLTEN METAL BATH

[75] Inventors: Yuji Okumura, Ise; Shoji Saeki, Matsusaka, both of Japan

[73] Assignee: Central Glass Company, Limited, Ube, Japan

[21] Appl. No.: 660,011

[22] Filed: Feb. 25, 1991

[30] Foreign Application Priority Data

Feb. 23, 1990 [JP] Japan .................................... 2-43415

[51] Int. Cl.$^5$ ............................................. C03B 18/18
[52] U.S. Cl. ........................................ 65/29; 65/99.2; 65/99.5; 65/160; 65/346
[58] Field of Search .................. 65/29, 99.2, 99.5, 160, 65/325, 326, 346, 347

[56] References Cited

U.S. PATENT DOCUMENTS

| | | | |
|---|---|---|---|
| 3,856,496 | 12/1974 | Nesbitt et al. | 65/346 X |
| 4,004,900 | 1/1977 | Staahl et al. | 65/29 |
| 4,030,902 | 6/1977 | Nagae | 65/29 |
| 4,306,898 | 12/1981 | Masuda et al. | 65/29 |
| 4,337,076 | 1/1982 | Shaw | 65/99.5 X |
| 4,481,024 | 11/1984 | Bly | 65/346 X |
| 4,599,100 | 7/1986 | Demarest | 65/346 |
| 4,732,001 | 3/1988 | Hidai et al. | 65/99.5 X |

Primary Examiner—Robert L. Lindsay
Attorney, Agent, or Firm—Fleit, Jacobson, Cohn, Price, Holman & Stern

[57] ABSTRACT

Concerning the manufacture of sheet glass by the float process using, as a glass melting and refining tank furnace, a common regenerative furnace having two oppositely arranged sets of burners which are periodically alternately operated with a temporary interruption of firing operation at each reversal of firing, the invention relates to the control of the rate of feed of molten glass from the tank furnace onto a molten metal bath through a canal provided with a control tweel which can be moved upward and downward. At each reversal of firing in the furnace the tweel is temporarily lifted so as to compensate for a decrease in the volumetric rate of flow of molten glass through the canal caused by the temporary interruption of firing operation.

7 Claims, 2 Drawing Sheets

METHOD OF CONTROLLING FEED OF MOLTEN GLASS ONTO MOLTEN METAL BATH

BACKGROUND OF THE INVENTION

This invention relates to the manufacture of sheet glass by a float process, i.e. by forming molten glass into a continuous ribbon of glass while it is floating on a molten metal, and more particularly to a method of controlling the volumetric rate of flow of molten glass from a glass melting and refining furnace onto a bath of molten metal in order to stabilize the width and thickness of the glass ribbon on the molten metal, the furnace being a regenerative furnace having two sets of oppositely arranged and alternately operatable burner nozzles.

In the manufacture of sheet glass by the float process molten glass is delivered from a glass melting and refining tank furnace onto a bath of molten metal in a forming chamber usually through a canal having a bottom and side walls. The canal is provided with a vertically movable gate called tweel such that an opening through which the molten glass flows is defined between the lower end of the tweel and the bottom of the canal. The volumetric rate of the flow of the molten glass into the forming chamber is primarily governed by the size of this opening, and the opening size depends on the vertical position of the tweel.

In the float process it is favorable to precisely stabilize the width of the glass ribbon formed on the molten metal bath for the enhancement of the yield of sheet glass product. The width of the glass ribbon is affected by the volumetric rate of flow of the molten glass through the aforementioned opening, and some variations occur in the flow rate with variations in the temperature and viscosity of the molten glass in the glass melting and refining furnace. To correct deviations of the glass ribbon width from an aimed value it is customary to control the volumertic rate of flow of the molten glass onto the molten metal bath by minutely controlling the vertical position of the tweel.

For instance, U.S. Pat. No. 4,030,902 shows to find the width of the glass ribbon on the molten metal bath at an appropriate distance from the tweel by detecting the positions of the side edges of the glass ribbon with video-analyzers each of which includes an image pickup tube and, if the found width deviates from an aimed value, regulate the vertical position of the tweel according to the amount of the deviation. JP 59-19887 and JP 59-19888 relate to a tweel position control method of the type shown in U.S. Pat. No. 4,030,902 and propose to regulate the tweel position on the basis of the result of periodical averaging of the detected deviations of the glass ribbon width if the deviations are within a predetermined range but on the basis of the result of periodical sampling and proportional-and-integral treatment of signals representative of the deviations if the deviations are not within that range, and, besides, JP 59-19888 proposes to regulate the tweel position in dependence on the temperature of the molten glass flowing in the canal at a section slightly upstream of the tweel.

Meanwhile, in the industrial practice of the float process usually the glass melting and refining tank furnace is a regenerative furnace having two sets of burner nozzles which are oppositely arranged in the two side walls of the tank furnace, respectively. A regenerator is provided to each set of burners to preheat combustion air with hot exhaust gases, and the two sets of burners are periodically alternately operated with a temporary interruption of firing at each shift of the operation of one set of burners to the operation of the opposite set of the opposite burners.

In our view, when a regenerative furnace of the above described type is used in the manufacture of sheet glass by the float process any of the hitherto proposed tweel position control methods is still insufficient for accurate control the with and thickness of the glass ribbon formed on the molten metal bath.

SUMMARY OF THE INVENTION

The present invention is concerned with the manufacture of sheet glass by the float process using a regenerative furnace of the above described type as a glass melting and refining tank furnace, and it is an object of the invention to provide an improved method for precisely controlling the volumetric rate of flow of molten glass from the tank furnace to a molten metal bath so as to stabilize the width and thickness of the glass ribbon formed on the molten metal.

Concerning the manufacture of sheet glass by the float process using a glass melting and refining tank furnace of the above described regenerative type, the present invention provides an improved method for controlling the volumetric rate of flow of molten glass from the tank furnace onto a molten metal bath through an opening defined in a canal by an upwardly and downwardly movable tweel by controlling the vertical position of the tweel. The improvement according to the invention comprises the step of temporarily lifting the tweel at each shift of the operation of one set of burners in the furnace to the operation of the other set of burners so as to compensate for a decrease in the volumetric rate of flow of the molten glass caused by the temporary interruption of firing in the furnace.

We have recognized that considerable variations in the width of the glass ribbon formed on the molten metal bath occur at each shift of the operation of one set of burners in the regnerative tank furnace to the operation of the opposite set of burners. (The shift will be referred to as reversal of firing.) As the burning operation is temporarily interrupted at each reversal of firing the furnace pressure in the melting zone lowers so that the furnace pressures in the refining and conditioning zones also lower. As a result the temperature of molten glass in the conditioning zone lowers, whereby the viscosity of the molten glass flowing into the forming chamber increases. For these reasons the temporary interruption of burning operation causes a decrease in the volumetric rate of flow of molten glass onto the molten metal bath.

According to the invention the decrease in the rate of feed of molten glass onto the molten metal bath is compensated by appropriately raising the vertical position of the tweel at each reversal of firing in the furnace. The temporary interruption of firing operation lasts only for a short period of time such as about 30–40 sec, and as the firing operation is restarted the furnace pressure returns to a prover level in a relatively short period of time. In this invention it is preferred to keep the tweel in the temporarily lifted position for a period of time longer than the period required for the recovery of a proper furnace pressure. Also it is preferred to perform feedback control of the vertical position of the tweel in a known manner during steady operation of the glass melting furnace.

By using a control method according to the invention it is possible to remarkably diminish variations in the volumetric rate of flow of molten glass onto the molten metal bath, and consequently it is possible to minimize variations in the width of the glass ribbon formed on the molten metal bath and also in the thickness of the glass ribbon. It will be readily understood that the tweel position control according to the invention can be automated by using known techniques.

DESCRIPTION OF THE PREFERRED EMBODIMENTS

Figure 1:
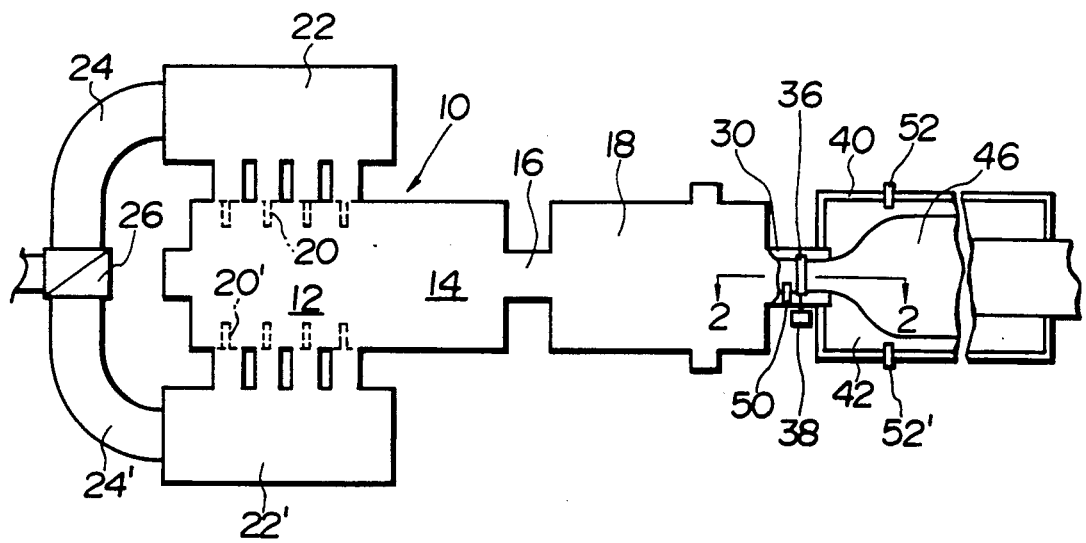
FIG. 1 is a schematic and partially cutaway plan view of a glass melting and refining tank furnace of regenerative type and a molten metal bath onto which the molten glass is delivered.

In FIG. 1 there is shown a glass melting and refining tank furnace 10 in which an end zone 12 is used as a melting zone. Contiguous to the melting zone 12 there is a refining zone 14, and a throat section 16 connects the refining zone 14 to another end zone 18 called conditioning zone. At the outlet end of the conditioning zone 18 the tank furnace 10 is connected to a float glass forming chamber 40 by a canal 30.

The furnace 10 has a set of burner nozzles 20 projecting from a side wall of the melting zone 12 and another set of burner nozzles 20' projecting from the opposite side wall. To use the heat of the hot exhaust gases to preheat combustion air there are two regenerators 22 and 22' on the two opposite sides of the melting zone 12, respectively. A flue 24 extending from the regenerator 22 connects with another flue 24' extending from the opposite regenerator 22', and there is a switching valve 26 at the junction of the two flues 24, 24'.

Figure 2:
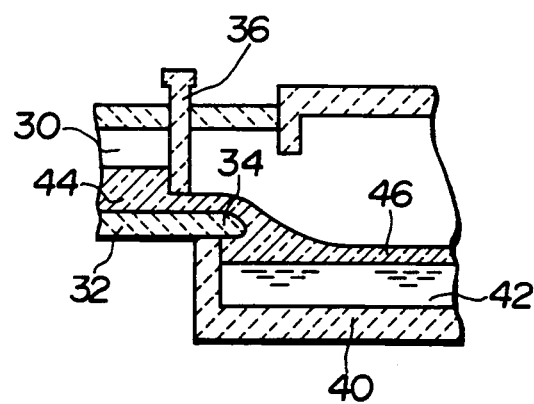
FIG. 2 is a partial and elevational sectional view taken along the line 2—2 in FIG. 1 and shows a control tweel provided in a canal connecting the furnace to the molten metal bath.

The float glass forming chamber 40 is partly filled with a bath of molten metal 42 such as molten tin. As shown in FIG. 2, the bottom 32 of the canal 30 protrudes into the forming chamber as a so-called lip tile 34, and a tweel 36 is provided such that molten glass 44 flows into the forming chamber through an opening defined between the lower end of the tweel 36 and the bottom 32 of the cannal 30. To regulate the size of the opening the tweel 36 can be moved upward and downward by operating an actuator 38 in FIG. 1. The molten glass 44 flows over the lip tile 34 and downwardly onto the molten metal bath 42. As the molten glass 44 is forced to advance on the surface of the molten metal 42 in the well known manner a ribbon 46 of molten glass is formed on the molten metal 42. As can be seen in FIG. 1 in the canal 30 there is provided a radiation pyrometer 50 to detect the temperature of the molten glass 44 flowing through the canal 30, and two video-analyzers 52 and 52' each of which includes an image pickup tube are provided on the two opposite side walls of the forming chamber 40, respectively, at an appropriate distance from the inlet end of the chamber 40 to detect the positions of the two opposite side edges of the molten glass ribbon 46. The pyrometer 50 and the video-analyzers 52, 52' are used in controlling the rate of delivery of the molten glass 44 from the tank furnace 10 onto the molten metal bath 42 by lifting or lowering the tweel 36.

In operation, a mixture of raw materials of glass is continuously fed into the melting zone 12 of the tank furnace 10 and melted by periodically alternately operating the two sets of burner nozzles 20 and 20'. One set of burner nozzles (e.g. 20) are operated for a predetermined period of time (e.g. 20 min) to inject fuel oil by the action of compressed air (primary air) together with combustion air which is heated in the regenerator 22. During firing by the operation of the burner nozzles 20 the hot exhaust gases enter the regenerator 22' on the opposite side to make heat exchange with the checker brick in the regenerator 22' and then flows through the flue 24' for dissipation into the atmosphere via the switching valve 26 and a dust separator (not shown). By the firing operation the glass composition is melted, and the molten glass 44 advances through the tank furnace 10 and flows onto the molten metal bath 42 in the forming chamber 40 in the above described manner. During steady operation of the furnace 10 the vertical position of the tweel 36 is controlled by a known method so as to stabilize the width of the glass ribbon 46 on the molten metal 42.

For example, as shown in JP 59-19887 and JP 59-19888, actual width of the molten glass ribbon 46 is periodically (e.g. at about 1 sec intervals) determined from the signals produced by the video-analyzers 52, 52' to find deviation of the actual width from an aimed width, and the vertical position of the tweel 36 is controlled according to the amount of deviation of the glass ribbon width from the aimed width. More particularly, if the amount of the found deviation is within a predetermined range of allowance the tweel position is controlled on the basis of an average or an integral of the deviation values over a predetermined period of time, and otherwise the tweel position is controlled on the basis of the result of proportional-and-integral treatment of sampled deviation values over a predetermined period of time. In addtion, it is preferable to control the vertical position of the tweel 36 on the basis of the temperature of the molten glass 44 in the canal 30 detected by the radiation pyrometer 50, as shown in JP 59-19888.

After the lapse of the predetermined burning operation time (e.g. 20 min) the feed of fuel oil and compressed air to the burner nozzles 20 is stopped. Then the valve 26 is switched to reverse the direction of the flow of combustion air and exhaust gases, and thereafter firing operation is resumed by operating the burner nozzles 20' on the opposite side to inject fuel oil and combustion air which is preheated in the regnerator 22'.

Figure 3:
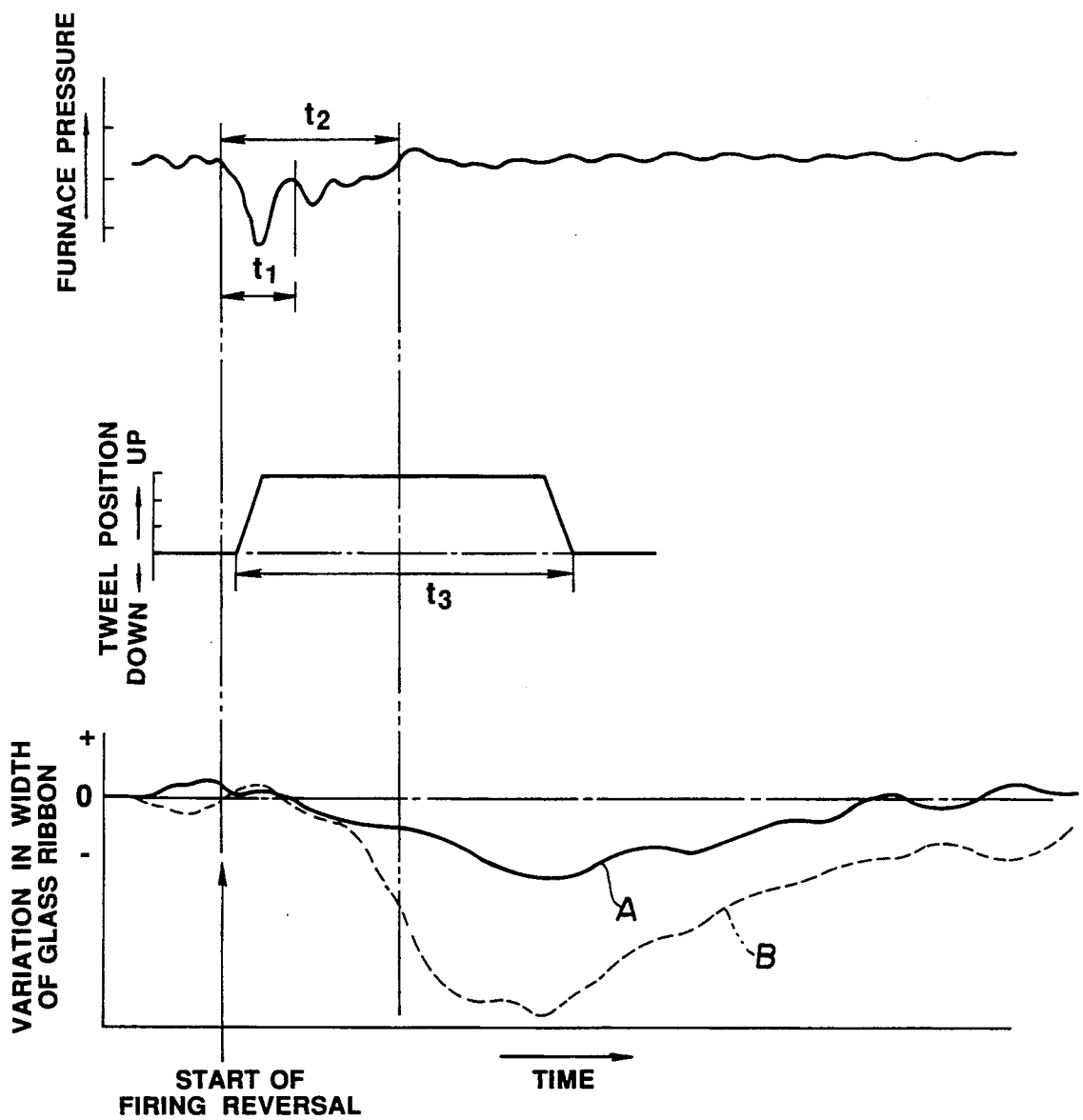
FIG. 3 is a chart which is illustrative of the manner of controlling the vertical position of the tweel by a method according to the invention at a firing reversal in the glass melting furnace and the effect of the tweel position control on the width of the glass ribbon formed on the molten metal bath.

During the above described firing reversal procedure the firing operation is interrupted for a short period of time, herein called firing interruption time, which is usually about 30-40 sec. In the chart of FIG. 3, $t_1$ indicates the firing interruption time. As a result the furnace pressure in the melting zone 12 (also in the refining 14 and the conditioning zone 18) lowers as is explanatorily shown in the chart of FIG. 3. After resuming the firing operation the furnace pressure returns to a proper level, but it takes a time $t_2$ which is longer than the firing interruption time $t_1$ by about 20-70 sec to recover the proper furnace pressure because at an initial stage of the resumed firing operation the combustion is incomplete.

The lowering of the furnace pressure in the conditioning zone 18 causes the molten glass 44 in this zone 18 and also in the canal 30 to become lower in temperature and higher in viscosity, whereby the volumetric rate of flow of the molten glass onto the molten metal bath 42 decreases. Therefore, the width of the glass ribbon 46 on the molten metal 42 becomes considerably smaller than an aimed width, and a considerable length of time elapses before the glass ribbon width becomes close to the aimed width.

According to the invention, at each reversal of firing in the furnace 10 the tweel 36 is temporarily lifted in order to minimize the unfavorable influence of the interruption of firing on the width of the glass ribbon 46. FIG. 3 shows that the tweel 36 is lifted by operating the actuator 38 soon after stopping the feed of fuel oil to one set of burner nozzles (20 or 20'). The amount of the lift is suitably determined according to the width of the glass ribbon 46 at the time of beginning the lifting and the temperature of the molten glass in the canal 30. The tweel 36 is kept in the lifted position for a period of time, $t_3$, which is longer than the time $t_2$ because after the recovery of a proper furnace pressure still some time is required for the return of the lowered temperature of the molten glass in the canal 30 to a proper level. It is suitable that the length of the time $t_3$ ranges from about $(t_1+120)$ sec to about $(t_1+190)$ sec. After the lapse of the time $t_3$ the tweel 36 is lowered to the position taken at the start of the reversal of firing. While the tweel position is raised in this manner, the feedback control of the tweel position based on the detected with of the glass ribbon 46 and/or the detected temperature of the molten glass is interrupted.

If the tweel 36 is not lifted, a reversal of firing in the furnace 10 results in variations in the width of the glass ribbon 46 generally in the manner as represented by the curve B (broken line) in FIG. 3, and in an experiment the maximum deviation of the width from the aimed width reached about 3 in. When the tweel 36 is lifted in the manner as shown in FIG. 3 variations in the glass ribbon width resulting from the same reversal of firing become as represented by the curve A (in solid line) in FIG. 3, and in an experiment which was conducted under the same conditions as in the afore-mentioned experiment the maximum deviation of the width from the aimed width was less than 1 in. When the tweel position is controlled in accordance with the invention variations in the thickness of the glass ribbon 46 are also reduced so as to fall within a range of allowance.

The above described temporary lifting of the tweel 36 is made at each reversal of firing in the furnace 10. The lifting of the tweel 36 does not need to be exactly as illustrated in FIG. 3. For example, the tweel 36 may be lifted immediately before stopping the feed of fuel oil to one set of burner nozzles 20 or 20', and in that case it is possible to automatically perform the temporary lifting of the tweel by using a timer or the like since revesals of firing are made at nearly constant intervals.

What is claimed is:

1. In a method of controlling the volumetric rate of flow of molten glass from a glass melting and refining tank furnace onto a molten metal bath through an opening defined in a canal by an upwardly and downwardly movable tweel by controlling the vertical position of the tweel, the tank furnace being a regenerative furnace having two oppositely arranged sets of burners which are operated periodically alternately with a temporary interruption of firing at each shift of the operation of one set of burners to the operation of the other set of burners, the improvement comprising the step of temporarily lifting the tweel at each shift of the operation of one set of burners in the furnace to the operation of the other set of burners so as to compensate for a decrease in the volumetric rate of flow of the molten glass caused by the temporary interruption of firing in the furnace.

2. A method according to claim 1, wherein the temporary lifting of the tweel is continued for a predetermined period of time which is longer than the duration of the temporary interruption of firing in the furnace.

3. A method according to claim 2, wherein said predetermined period of time is longer than said duration by at least about 120 sec and at most about 190 sec.

4. A method according to claim 1, wherein the temporary lifting of the tweel is started immediately after interrupting the firing operation of said one set of burners.

5. A method according to claim 1, wherein the temporary lifting of the tweel is started immediately before interrupting the firing operation of said one set of burners.

6. A method according to claim 1, further comprising the steps of detecting the width of a glass ribbon formed on the molten metal bath and controlling the vertical position of the tweel based on the detected width of the glass ribbon during steady firing operation of either of the two sets of burners in the furnace.

7. A method according to claim 1, further comprising the steps of detecting the temperature of the molten glass in said canal and controlling the vertical position of the tweel based on the detected temperature of the molten glass during steady firing operation of either of two sets of burners in the furnace.

* * * * *